US008258782B2

(12) United States Patent
Kaita et al.

(10) Patent No.: US 8,258,782 B2
(45) Date of Patent: *Sep. 4, 2012

(54) ANGLE DETECTING APPARATUS AND ANGLE DETECTING METHOD

(75) Inventors: Yoshio Kaita, Tokyo (JP); Hirokazu Miyamoto, Tokyo (JP); Toshinao Kido, Tokyo (JP); Junya Fukuda, Tokyo (JP)

(73) Assignee: TDK Corporation, Tokyo (JP)

( * ) Notice: Subject to any disclaimer, the term of this patent is extended or adjusted under 35 U.S.C. 154(b) by 495 days.

This patent is subject to a terminal disclaimer.

(21) Appl. No.: 12/458,881

(22) Filed: Jul. 27, 2009

(65) Prior Publication Data

US 2010/0026282 A1 Feb. 4, 2010

(30) Foreign Application Priority Data

Jul. 30, 2008 (JP) .................................. 2008-196456
Feb. 12, 2009 (JP) .................................. 2009-030093

(51) Int. Cl.
*G01B 7/30* (2006.01)

(52) U.S. Cl. .................. 324/207.25; 324/173; 324/174; 324/207.11; 324/207.13; 324/207.15; 324/207.16; 324/207.18; 324/207.2; 324/207.21; 324/207.22; 324/207.23; 324/207.24; 310/67 R; 310/266; 310/40 R; 310/112; 310/152; 310/156.01; 310/156.43; 318/400.1; 318/400.41; 318/685; 318/696

(58) Field of Classification Search .. 324/207.2–207.25, 324/173, 174, 207.11, 207.13, 207.15, 207.16, 324/207.18; 310/67 R, 266, 40 R, 112, 152, 310/156.01, 156.43; 318/400.1, 400.41, 318/685, 696

See application file for complete search history.

(56) References Cited

U.S. PATENT DOCUMENTS

| 2,541,422 | A | * | 2/1951 | Kirkland et al. ......... 310/156.01 |
| 3,273,001 | A | * | 9/1966 | Baermann ...................... 310/152 |
| 3,327,541 | A | * | 6/1967 | Clark et al. .................... 74/5.46 |
| 3,501,664 | A | * | 3/1970 | Veillette .................... 318/400.41 |
| 3,551,712 | A | * | 12/1970 | Jones et al. ................. 310/67 R |
| 3,678,386 | A | * | 7/1972 | Miles ............................. 324/174 |
| 3,732,449 | A | * | 5/1973 | Oishi et al. ............. 310/216.076 |
| 4,392,375 | A | * | 7/1983 | Eguchi et al. ............... 73/114.36 |
| 4,612,503 | A | * | 9/1986 | Shimizu et al. .......... 324/207.18 |
| 4,642,496 | A | * | 2/1987 | Kerviel et al. .............. 310/68 B |

(Continued)

FOREIGN PATENT DOCUMENTS

JP       A-09-287911       11/1997

(Continued)

*Primary Examiner* — Patrick Assouad
*Assistant Examiner* — Lamarr Brown
(74) *Attorney, Agent, or Firm* — Oliff & Berridge, PLC

(57) ABSTRACT

An angle detecting apparatus includes a rotor fixed to a rotating shaft, a pair of magnetic sensors arranged close to the outer periphery of the rotor so as to have a difference in angle ($\pi/2$) with respect to the center of rotation of the rotor, a differential operational circuit performing differential operation on detection signals output by the magnetic sensors to output a differential signal, and the angle calculating circuit calculating the angle of rotation of the rotating shaft based on the differential signal. The planar shape of the rotor is such that the sum of the distances between the center of rotation and the respective two points where two straight lines crossing at the center of rotation at a crossing angle of ($\pi/2$) cross the outer periphery of the rotor is constant, and the planar shape is symmetric with respect to a straight line passing through the center of rotation.

14 Claims, 10 Drawing Sheets

U.S. PATENT DOCUMENTS

| | | | | |
|---|---|---|---|---|
| 4,683,428 A | * | 7/1987 | Gete | 324/207.25 |
| 4,754,220 A | * | 6/1988 | Shimizu et al. | 324/207.18 |
| 5,903,205 A | * | 5/1999 | Goto et al. | 336/130 |
| 6,522,038 B2 | * | 2/2003 | Byram | 310/71 |
| 6,552,453 B2 | * | 4/2003 | Ohiwa et al. | 310/68 B |
| 6,707,291 B2 | * | 3/2004 | Goto et al. | 324/207.16 |
| 6,762,897 B1 | * | 7/2004 | Kabashima et al. | 360/72.1 |
| 7,009,389 B2 | * | 3/2006 | Nakano et al. | 324/207.25 |
| 7,127,369 B2 | * | 10/2006 | Fukumura et al. | 702/150 |
| 7,154,262 B2 | * | 12/2006 | Kamizono et al. | 324/207.25 |
| 7,221,149 B2 | * | 5/2007 | Fukuoka et al. | 324/174 |
| 7,411,388 B2 | * | 8/2008 | Sagoo et al. | 324/207.25 |
| 7,427,859 B2 | * | 9/2008 | Fukuoka et al. | 324/207.21 |
| 7,994,774 B2 | * | 8/2011 | Thomas et al. | 324/207.2 |
| 8,106,649 B2 | * | 1/2012 | Kaita et al. | 324/207.25 |
| 2005/0147202 A1 | * | 7/2005 | Grass et al. | 378/19 |
| 2005/0162157 A1 | * | 7/2005 | Kamizino et al. | 324/207.25 |
| 2006/0113990 A1 | * | 6/2006 | Schodlbauer | 324/207.24 |
| 2006/0244439 A1 | * | 11/2006 | Fukuoka et al. | 324/207.2 |
| 2007/0035293 A1 | * | 2/2007 | Fukuoka et al. | 324/207.21 |

FOREIGN PATENT DOCUMENTS

| | | |
|---|---|---|
| JP | A-2001-091208 | 4/2001 |
| JP | B2-3200405 | 6/2001 |
| JP | A-2005-214750 | 8/2005 |

* cited by examiner

ANGLE DETECTING APPARATUS AND ANGLE DETECTING METHOD

BACKGROUND OF THE INVENTION

Field of the Invention

The present invention relates to an angle detecting apparatus and an angle detecting method for calculating the angle of rotation of a rotating shaft.

Description of the Related Art

Japanese Patent Laid-Open No. 2001-91208 proposes means for detecting the angle of rotation of a detection target such as a throttle valve. The means is an angle of rotation detecting apparatus is configured such that a magnetic field is generated between a magnet and a yoke and that a magnetic detection element located in the magnetic field is displaced from the center of rotation of a rotor. Displacing the position of the magnetic detection element from the center of rotation of the rotor changes the relationship between the angle of a magnetic flux crossing the magnetic detection element and the angle of rotation of the rotor. This change can be utilized to optionally set the output property of the magnetic detection element to any value within a wide range of values with respect to the angle of rotation. Thus, the property of detecting the angle of rotation can be improved.

However, the above-described angle of rotation detecting apparatus is disadvantageous in that a given limit is imposed on the detected angle (see FIG. 8B in Japanese Patent Laid-Open No. 2001-91208).

SUMMARY OF THE INVENTION

Thus, an object of the present invention is to propose an angle detecting apparatus and an angle detecting method in which no limit is imposed on the detected angle.

To accomplish the object, the present invention provides an angle detecting apparatus comprising a rotor fixed to a rotating shaft and for which when an XY orthogonal coordinate system is defined on a plane of rotation for the rotor with a center of rotation of the rotor defined as a coordinate origin, a sum of distances between the center of rotation and respective two points where two straight lines crossing at the center of rotation at a crossing angle of ($\pi/n$; (n) is any integer of at least two) cross an outer periphery of the rotor is constant and for which a planar shape of the rotor projected on the plane of rotation is symmetric with respect to $Y=\tan(\pi/2n)X$, a first magnetic sensor and a second magnetic sensor arranged close to the outer periphery of the rotor so as to have a difference in angle ($\pi/n$) with respect to the center of rotation, the first magnetic sensor detecting a change in magnetic field corresponding to a change in a first distance between the outer periphery of the rotor and the first magnetic sensor which distance varies periodically as the rotor rotates, to output a first detection signal, the second magnetic sensor detecting a change in magnetic field corresponding to a change in a second distance between the outer periphery of the rotor and the second magnetic sensor which distance varies complementarily in conjunction with variation in first distance, to output a second detection signal, differential operational means for performing differential operation on the first detection signal and the second detection signal to output a differential signal, and angle calculating means for calculating the angle of rotation of the rotating shaft based on the differential signal.

The angle detecting apparatus according to the present invention uses the rotor for which the sum of the distances between the center of rotation and the respective two points where the two straight lines crossing at the center of rotation of the rotor at the crossing angle of ($\pi/n$) cross the outer periphery of the rotor is constant and for which the planar shape of the rotor projected on the plane of rotation is symmetric with respect to $Y=\tan(\pi/2n)X$. Thus, the differential signal is a substantial sine wave signal containing information on the angle of rotation of the rotor; the differential signal is obtained by performing differential operation on the first and second detection signals output by the first and second magnetic sensors arranged close to the outer periphery of the rotor with the difference in angle ($\pi/n$) with respect to the center of rotation. Consequently, angle detection can be achieved with a reduced detection error over the entire range of angles (0° to 360°). Furthermore, the rotor need not be attached to the end surface of the rotating shaft. This facilitates mounting of the angle detecting apparatus.

In this case, the distance between the first magnetic sensor and the center of rotation of the rotor is desirably equal to the distance between the second magnetic sensor and the center of rotation of the rotor. In this configuration, the first and second detection signals output by the first and second magnetic sensors are sufficiently symmetric. This allows the differential signal to be made more similar to the ideal sine wave.

Desirably, the rotor projected on the plane of rotation is shaped like a combination of 2n partial ellipses with a center angle ($\pi/n$). With this shape, the first and second detection signals output by the first and second magnetic sensors arranged close to the outer periphery of the rotor with the difference in angle ($\pi/n$) with respect to the center of rotation of the rotor are each a substantial sine wave signal for n periods taking n maximum values and n minimum values when the rotor makes one rotation. Thus, the differential signal obtained by performing differential operation on the first and second detection signals is a substantial sine wave signal for n periods which shows close geometrical similarity to the ideal sine waveform and which contains information on the rotational angle of the rotor. More desirably, the shape of the rotor projected on the plane of rotation contains no trough portion. This is because magnetic fields are disrupted in the trough portion.

In a preferred embodiment of the present invention, the rotor comprises a ferromagnetic material. The first magnetic sensor comprises a first magnet generating a magnetic field between the outer periphery of the rotor and the first magnetic sensor, and a first magnetoresistance effect element outputting the first detection signal in response to the magnetic field varying in response to variation in first distance. The second magnetic sensor comprises a second magnet generating a magnetic field between the outer periphery of the rotor and the second magnetic sensor, and a second magnetoresistance effect element outputting the second detection signal in response to the magnetic field varying in response to variation in second distance. In this configuration, the first distance between the rotor and the first magnetic sensor and the second distance between the rotor and the second magnetic sensor vary as the rotor rotates. These variations appear as variations in the resistance values of the first and second magnetic sensors, respectively. Thus, the first and second detection signals contain information on the angle of rotation of the rotor.

In the preferred embodiment of the present invention, the first magnetoresistance effect element comprises a first free magnetic layer for which a longitudinal direction is set to align with a direction of the center of rotation of the rotor. The second magnetoresistance effect element comprises a second free magnetic layer for which the longitudinal direction is set to align with the direction of the center of rotation of the rotor.

By setting the longitudinal direction of the free magnetic layer to align with the direction of the center of rotation of the rotor, the accuracy of angle detection can be improved.

The present invention provides an angle detecting method of detecting an angle of rotation of a rotor fixed to a rotating shaft, using a first magnetic sensor and a second magnetic sensor arranged close to an outer periphery of the rotor so as to have a difference in angle ($\pi/n$; (n) is any integer of at least two) with respect to a center of rotation of the rotor, the method comprising a step of rotating the rotor for which when an XY orthogonal coordinate system is defined on a plane of rotation for the rotor with the center of rotation defined as a coordinate origin, a sum of distances between the center of rotation and respective two points where two straight lines crossing at the center of rotation at a crossing angle of ($\pi/n$) cross the outer periphery of the rotor is constant and for which a planar shape of the rotor projected on the plane of rotation is symmetric with respect to $Y=\tan(\pi/2n)X$, a step of allowing a first detection signal to be output by the first magnetic sensor detecting a change in magnetic field corresponding to a change in a first distance between the outer periphery of the rotor and the first magnetic sensor which distance varies periodically as the rotor rotates, a step of allowing a second detection signal to be output by the second magnetic sensor detecting a change in magnetic field corresponding to a change in a second distance between the outer periphery of the rotor and the second magnetic sensor which distance varies complementarily in conjunction with variation in first distance, a step of performing differential operation on the first detection signal and the second detection signal to output a differential signal, and a step of calculating the angle of rotation of the rotating shaft based on the differential signal.

The angle detecting method according to the present invention uses the rotor for which the sum of the distances between the center of rotation of the rotor and the respective two points where the two straight lines crossing at the center of rotation of the rotor at the crossing angle of ($\pi/n$) cross the outer periphery of the rotor is constant and for which the planar shape of the rotor projected on the plane of rotation is symmetric with respect to $Y=\tan(\pi/2n)X$. Thus, the differential signal is a substantial sine wave signal containing information on the angle of rotation of the rotor; the differential signal is obtained by performing differential operation on the first and second detection signals output by the first and second magnetic sensors arranged close to the outer periphery of the rotor with the difference in angle ($\pi/n$) with respect to the center of rotation of the rotor. Consequently, angle detection can be achieved with a reduced detection error over the entire range of angles (0° to 360°).

Another aspect of the present invention provides an angle detecting apparatus comprising a rotor fixed to a rotating shaft and for which when an XY orthogonal coordinate system is defined on a plane of rotation for the rotor with a center of rotation of the rotor defined as a coordinate origin, a sum of distances between the center of rotation and respective two points where two straight lines crossing at the center of rotation at a crossing angle of ($\pi/n$; (n) is any integer of at least two) cross an outer periphery of the rotor is constant and for which a planar shape of the rotor projected on the plane of rotation is symmetric with respect to $Y=\tan(\pi/2n)X$, a first magnetic sensor and a second magnetic sensor arranged close to the outer periphery of the rotor so as to have a difference in angle ($\pi/n$) with respect to the center of rotation, the first magnetic sensor detecting a change in magnetic field corresponding to a change in a first distance between the outer periphery of the rotor and the first magnetic sensor which distance varies periodically as the rotor rotates, to output a first detection signal, the second magnetic sensor detecting a change in magnetic field corresponding to a change in a second distance between the outer periphery of the rotor and the second magnetic sensor which distance varies periodically as the rotor rotates, to output a second detection signal, a conversion table in which the angle of rotation of the rotating shaft corresponding to each of the first and second detection signals is stored, and angle calculating means for comparing the first and second detection signals output by the first and second magnetic sensors with the conversion table to output the angle of rotation of the rotor.

The angle detecting apparatus according to the present invention uses the rotor for which when the XY orthogonal coordinate system is defined on the plane of rotation for the rotor with the center of rotation of the rotor defined as a coordinate origin, the sum of the distances between the center of rotation and the respective two points where the two straight lines crossing at the center of rotation at the crossing angle of ($\pi/n$; (n) is any integer of at least two) cross the outer periphery of the rotor is constant and for which the planar shape of the rotor projected on the plane of rotation is symmetric with respect to $Y=\tan(\pi/2n)X$. Thus, the distance between the outer periphery of the rotor and each of the first and second magnetic sensors arranged with a difference in phase (mechanical angle: $\pi/2n$) with respect to the center of rotation and at an equal distance from the center of rotation varies periodically. The first and second detection signals output by the first and second magnetic sensors each contain information on the angle of rotation of the rotor, and have a phase difference of 90 degrees (electrical angle) therebetween. Thus, the angle of rotation of the rotor can be determined by functionally processing the first and second detection signals.

In a preferred embodiment of the present invention, preferably, each of the first and second detection signals is a substantial sine wave signal, and the angle calculating means compares the conversion table with one of the first and second detection signals which falls within an angular range of ±22.5 degrees from an angle at which the detection signal takes an intermediate value, to output the angle of rotation of the rotor. By reading a value close to the intermediate value, at which amplitude varies significantly, instead of a value close to a peak of a signal waveform at which the amplitude varies insignificantly, the adverse effect of possible noise can be inhibited.

Another aspect of the present invention provides an angle detecting method of detecting an angle of rotation of a rotor fixed to a rotating shaft, using a first magnetic sensor and a second magnetic sensor arranged close to an outer periphery of the rotor so as to have a difference in angle ($\pi/2n$; (n) is any integer of at least two) with respect to a center of rotation of the rotor, the method comprising a step of rotating the rotor for which when an XY orthogonal coordinate system is defined on a plane of rotation for the rotor with the center of rotation defined as a coordinate origin, a sum of distances between the center of rotation and respective two points where two straight lines crossing at the center of rotation at a crossing angle of ($\pi/n$) cross the outer periphery of the rotor is constant and for which a planar shape of the rotor projected on the plane of rotation is symmetric with respect to $Y=\tan(\pi/2n)X$, a step of allowing a first detection signal to be output by the first magnetic sensor detecting a change in magnetic field corresponding to a change in a first distance between the outer periphery of the rotor and the first magnetic sensor which distance varies periodically as the rotor rotates, a step of allowing a second detection signal to be output by the second magnetic sensor detecting a change in magnetic field corresponding to a change in a second distance between the outer periphery of the rotor and the second magnetic sensor which distance varies periodically as the rotor rotates, and a step of comparing a conversion table in which the angle of rotation of the rotating shaft corresponding to each of the first and second detection signals is stored, with the first and second detection signals output by the first and second magnetic sensors to output the angle of rotation of the rotor.

The angle detecting method according to the present invention uses the rotor for which when the XY orthogonal coordinate system is defined on the plane of rotation for the rotor with the center of rotation of the rotor defined as a coordinate origin, the sum of the distances between the center of rotation and the respective two points where the two straight lines crossing at the center of rotation at the crossing angle of ($\pi/n$; (n) is any integer of at least two) cross the outer periphery of the rotor is constant and for which the planar shape of the rotor projected on the plane of rotation is symmetric with respect to $Y=\tan(\pi/2n)X$. Thus, the distance between the outer periphery of the rotor and each of the first and second magnetic sensors arranged with a difference in phase (mechanical angle: $\pi/2n$) with respect to the center of rotation and at an equal distance from the center of rotation varies periodically. The first and second detection signals output by the first and second magnetic sensors each contain information on the angle of rotation of the rotor, and have a difference of 90 degrees in phase (electrical angle) therebetween. Thus, the angle of rotation of the rotor can be determined by functionally processing the first and second detection signals.

The present invention can provide an angle detecting apparatus and an angle detecting method in which no limit is imposed on the detected angle.

DETAILED DESCRIPTION OF THE PREFERRED EMBODIMENTS

Figure 1:
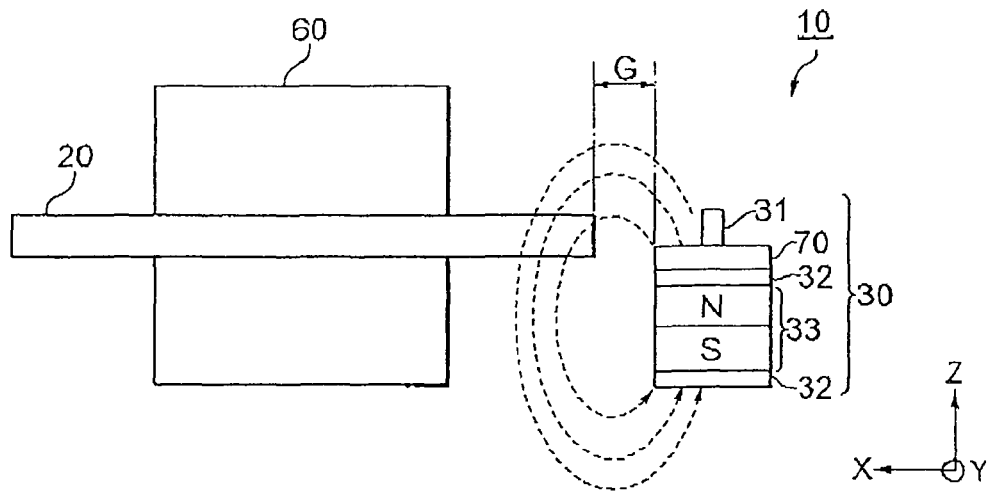
FIG. 1 is a diagram schematically illustrating the configuration of an angle detecting apparatus according to the present embodiment.

Embodiments of the present invention will be described with reference to the drawings. In the embodiments, the same reference numerals denote the same members, and duplicate descriptions are omitted.

FIG. 1 is a diagram illustrating the configuration of an angle detecting apparatus 10 according to the present embodiment.

The angle detecting apparatus 10 includes a rotor 20 fixed to a rotating shaft 60 and a magnetic sensor 30 located close to the outer periphery of the rotor 20 as main components. The rotor 20 is made up of a ferromagnetic material (for example, iron, cobalt, or nickel). The rotating shaft 60 is, for example, a drive shaft of a vehicle or a drive shaft of a motor, and is rotationally driven by a driving force from a power generation source. The axial direction of the rotating shaft is a Z direction. Rotating the rotating shaft 60 rotates the rotor 20 in an XY plane.

The magnetic sensor 30 includes, as main components, a magnet 33 functioning as magnetic field generating means for generating external magnetic fields, and a magnetoresistance effect element 31 that detects variation in external magnetic field as variation in voltage. The magnetoresistance effect element 31 may be of a half bridge configuration or a full bridge configuration In a preferable implementation of the magnetic sensor 30, the magnetoresistance effect element 31 is located on the front surface of a printed circuit board 70 so as to be positioned on a straight line extending in the Z direction through the center point of the magnet 33, with the magnet 33 located on the back surface of the circuit board 70. To allow external magnetic fields generated by the magnet 33 to be efficiently collected, yokes 32 are preferably arranged on the respective poles of the magnets 33.

The magnetoresistance effect element 31 includes a pin magnetic layer (not shown in the drawings) for which magnetizing direction is set in a particular direction and which is configured so as to prevent a magnetized state (for example, the magnetizing direction or the intensity of the magnetization) from being affected by displacement of external magnetic fields, and a free magnetic layer (not shown in the drawings) in which the magnetized state changes according to variation in external magnetic fields. When the rotor 20 rotates in conjunction with rotation of the rotating shaft 60, the length of the gap G between the outer periphery of the rotor 20 and the magnetoresistance effect element 31 varies periodically. A change in the length of the gap G changes the magnetic flux density drawn from the magnet 33 located on the back surface of the magnetoresistance effect element 31, to the rotor 20 through the magnetoresistance effect element 31. This changes the magnetized state of the free magnetic layer in the magnetoresistance effect element 31. This in turn results in a difference in change in magnetized state between the pin magnetic layer, in which the magnetized state does not vary, and the free magnetic layer, in which the magnetized state varies. The difference in change in magnetized state is a physical quantity reflecting the angle of rotation of the rotor 20. Specifically, the difference appears as a change in the resistance value of the magnetoresistance effect element 31. The magnetoresistance effect element 31 is supplied with a bias current by the printed circuit board 70. A change in the resistance value of the magnetoresistance effect element 31 is detected as a change in output voltage. The output voltage from the magnetoresistance effect element 31 is processed in the form of a detection signal indicating the angle of rotation of the rotor 20.

Figure 3:
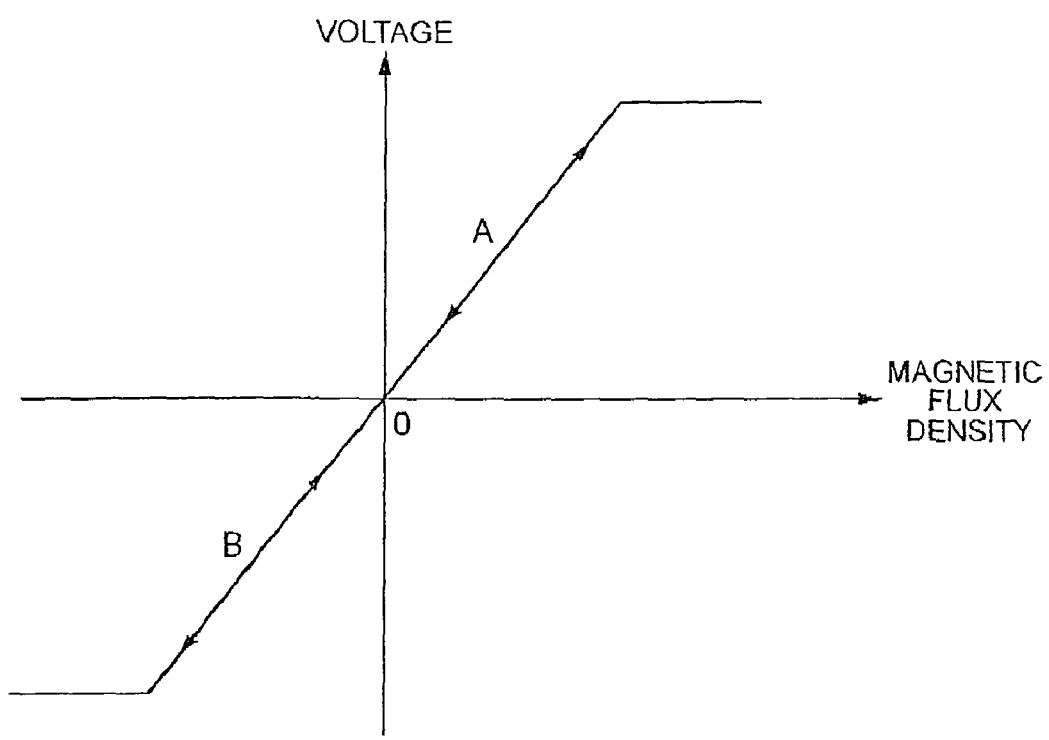
FIG. 3 is a graph showing the output property of a magnetoresistance effect element.

For the magnetoresistance effect element 31, the intensity of external magnetic fields, the average length of the gap G, and the like are preferably designed such that the magnetoresistance effect element 31 operates in regions A and B in which the magnetic flux density and the output voltage from the magnetoresistance effect element 31 have a linear relationship as shown in FIG. 3. In this case, an output from the magnetic sensor exhibits linearity according to the length of the gap G. The positional relationship, in a thrust direction (axial direction), between the rotor 20 and the magnetic sensor 30 is desirably such that the rotor 20 is prevented not only from coming off from the magnetoresistance effect element 31 but also from being displaced as a result of run-out caused by the rotation thereof. For example, when a mounting error is ±0.5 mm, the magnitude of run-out is ±0.5 mm, and the thickness of the magnetoresistance effect element 31 is 0.5 mm, the thickness of the rotor 20 is desirably at least 3.0 mm.

Figure 2:
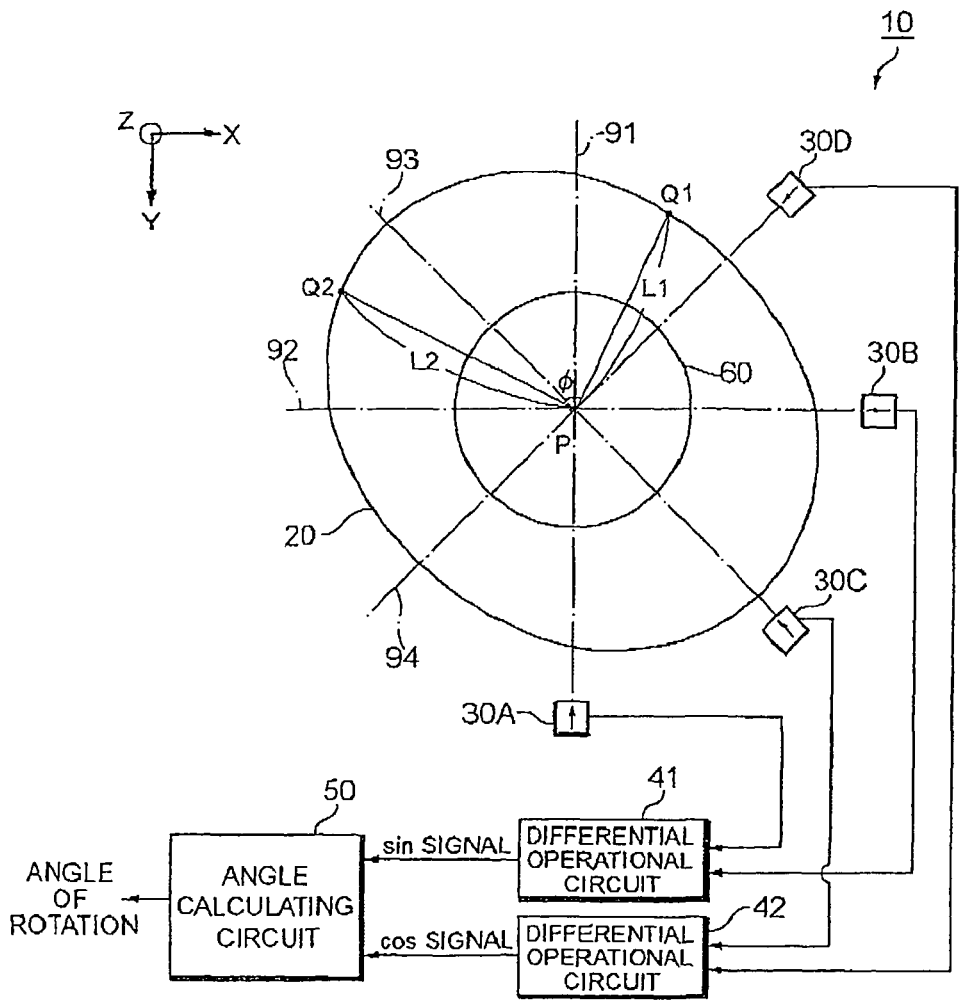
FIG. 2 is a diagram illustrating the system configuration of the angle detecting apparatus according to the present embodiment.

FIG. 2 is a diagram illustrating the system configuration of the angle detecting apparatus 10.

When an XY orthogonal coordinate system is defined on a plane of rotation for the rotor 20 with the center of rotation P of the rotor 20 as a coordinate origin, the shape (hereinafter referred to as the planar shape) of the rotor 20 projected on the plane of rotation (XY plane) meets the condition that the sum (L1+L2) of the distances between the center of rotation P and the respective two points (Q1 and Q2) where two straight lines crossing at the center of rotation P at a crossing angle $\phi=(\pi/2)$ cross the outer periphery of the rotor 20 is constant and the condition that the planar shape of the rotor 20 is symmetric with respect to Y=X (L1 denotes the segment length of a segment PQ1, and L2 denotes the segment length of a segment PQ2). The planar shape of the rotor 20 meeting these conditions corresponds to a combination of four partial ellipses with a center angle $(\pi/2)$. One rotation of the rotor 20 provides a detection signal of a substantial sine wave for two periods. It should be noted that in view of the condition that the planar shape of the rotor 20 is symmetric with respect to Y=X and the condition that one rotation of the rotor 20 provides a detection signal for two periods, the four partial ellipses have a total of two types of elliptic ratios.

Desirably, the planar shape of the rotor 20 has no trough portion. Magnetic fields are likely to be disturbed at trough portions. Thus, such a shape is unsuitable for accurate angle detection.

A pair of magnetic sensors 30A and 30B is located close to the outer periphery of the rotor 20 so as to have a difference in angle $(\pi/2)$ with respect to the center of rotation P. A pair of magnetic sensors 30C and 30D is located close to the outer periphery of the rotor 20 so as to have a difference in angle $(\pi/2)$ with respect to the center of rotation P. A straight line 91 connecting the magnetic sensor 30A to the center of rotation P is orthogonal to a straight line 92 connecting the magnetic sensor 30B to the center of rotation P. A straight line 93 connecting the magnetic sensor 30C to the center of rotation P is orthogonal to a straight line 94 connecting the magnetic sensor 30D to the center of rotation P. The adjacent magnetic sensors 30A and 30C are arranged so as to have a difference in angle $(\pi/4)$ with respect to the center of rotation P. The adjacent magnetic sensors 30B and 30D are arranged so as to have a difference in angle $(\pi/4)$ with respect to the center of rotation P. The magnetic sensors 30A, 30C, 30B, and 30D are fixed so as to have a difference in angle $(\pi/4)$ with respect to the center of rotation P from one another. Even with rotation of the rotor 20, the distance between the center of rotation P and each of the magnetic sensors 30A, 30C, 30B, and 30D is maintained constant.

To be distinguished from one another, the magnetic sensors 30A, 30B, 30C, and 30D shown in FIG. 2 are denoted by different reference numerals for convenience. However, the magnetic sensors 30A, 30B, 30C, and 30D substantially have the same configuration as that of the magnetic sensor 30. Thus, when the magnetic sensors 30A, 30B, 30C, and 30D need not be distinguished from one another, the magnetic sensors 30A, 30B, 30C, and 30D are simply collectively referred to as the magnetic sensor 30.

Figure 4:
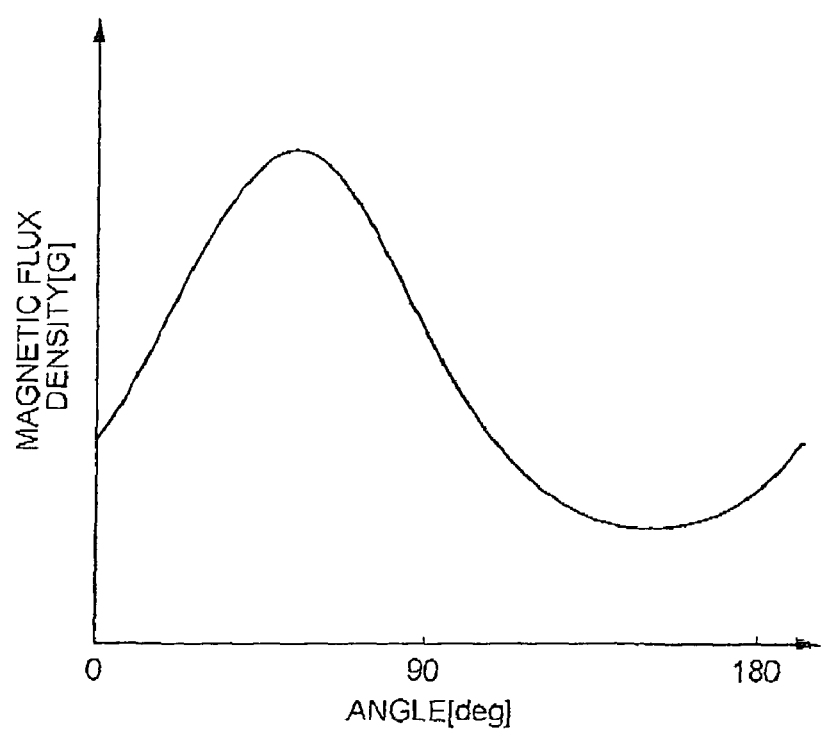
FIG. 4 is a graph showing variation in magnetic flux density with respect to the angle of rotation of a rotor.
Figure 5:
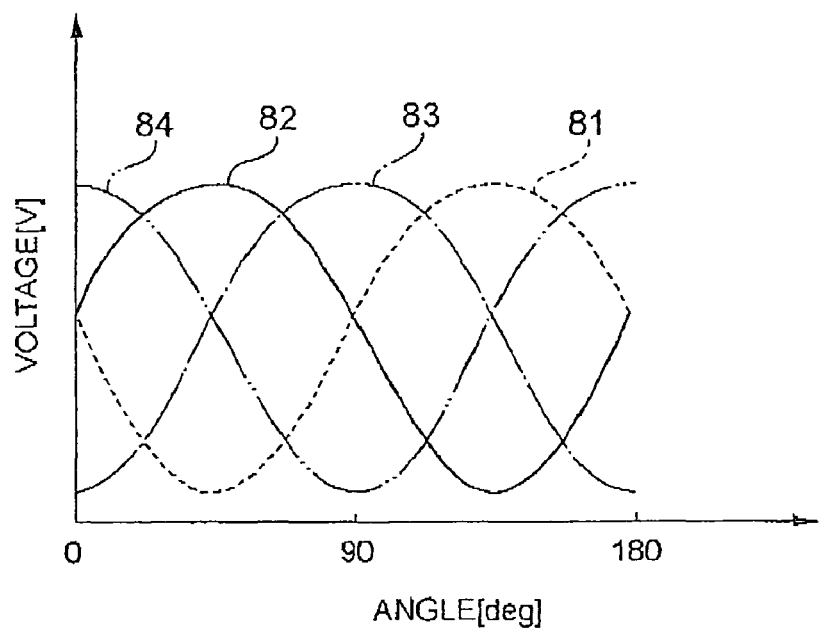
FIG. 5 is a graph showing two detection signals output by respective paired magnetic sensors.

When the rotor 20 makes a half rotation, a change for one period appears in a waveform showing variation in the magnetic flux density of external magnetic fields passing through the magnetic sensor 30 as shown in FIG. 4. When the rotor 20 is divided into two pieces by a segment passing through the center of rotation P, each piece is shaped like a combination of two partial ellipses having different elliptic ratios and each having a center angle $(\pi/2)$. Thus, the waveform for the magnetic flux density shown in FIG. 4 is not sinusoidal in a strict sense but is similar to a sinusoidal one. As described above, there is a linear relationship between the magnetic flux density passing through the magnetoresistance effect element 31 and the output voltage from the magnetoresistance effect element 31. Thus, a detection signal output by the magnetic sensor 30 has a waveform similar to that of a sine wave. Since the planar shape of the rotor 20 is such that the sum (L1+L2) of the distances (L1 and L2) between the center of rotation P and the respective two points (Q1 and Q2) where two straight lines crossing at the center of rotation P at the crossing angle $\phi=(\pi/2)$ cross the outer periphery of the rotor 20 is constant, when the first distance between the outer periphery of the rotor 20 and one of the paired magnetic sensors 30A and 30B arranged so as to have the difference in angle $(\pi/2)$ with respect to the center of rotation P, the magnetic sensor 30A, changes, the second distance between the outer periphery of the rotor 20 and the other magnetic sensors 30B changes complementarily in conjunction with the change in first distance. That is, a decrease in first distance increases the second distance by an amount corresponding to the decrease. Thus, the detection signals from the magnetic sensors 30A and 30B have a difference of 90 degrees in phase as shown in FIG. 5. In FIG. 5, reference numeral 81 denotes a detection signal from the magnetic sensor 30A. Reference numeral 82 denotes a detection signal from the magnetic sensor 30B. The different pair of magnetic sensors 30C and 30D arranged so as to have the difference in angle $(\pi/2)$ with respect to the center of rotation P similarly has a difference of 90 degrees in phase. Reference numeral 83 denotes a detection signal from the magnetic sensor 30C Reference numeral 84 denotes a detection signal from the magnetic sensor 30D.

The angle detecting apparatus 10 includes, in addition to the above-described rotor 20 and magnetic sensor 30, differential operational circuits 41 and 42 and an angle calculating circuit 50. The functions of the differential operational circuits 41 and 42 and the angle calculating circuit 50 are fulfilled by an IC chip (not shown in the drawings) mounted on the printed circuit board 70. The differential operational circuit 41 differentially processes two detection signals output by the pair of magnetic sensors 30A and 30B to calculate a sin signal (differential signal) Reference numeral 85 in FIG. 6 denotes a sin signal obtained by performing differential operation on the two detection signals 81 and 82 shown in FIG. 5. The sin signal is a substantial sine wave signal with a waveform very similar to the ideal sine waveform. The differential operational circuit 42 differentially processes two detection signals output by the different pair of magnetic sensors 30C and 30D to calculate a cos signal (differential signal). The cos signal is a substantial sine wave signal with a waveform very similar to the ideal sine waveform, and has a phase difference of 45 degrees from the sin signal. The angle calculating circuit 50 calculates the angle of rotation of the rotor 20 based on the sin signal, output by the differential operational circuit 41, and the cos signal, output by the differential operational circuit 42.

It should be noted that the pair of magnetic sensors 30C and 30D is not essential for detecting the angle of the rotor 20 and that the angle detection can be achieved using only the pair of magnetic sensors 30A and 30B. The longitudinal direction of the free magnetic layer in the magnetoresistance effect element 31 is not particularly limited. However, the results of the present inventors' experiments show that the angle detection can be accurately achieved particularly when the free magnetic layer is magnetized in a direction toward the center of rotation P (rotational-center direction). This is expected to be because when the longitudinal direction of the free magnetic layer is set, for example, to be orthogonal to the center of rotation, the magnetoresistance effect element 31 detects the average magnetic field that depends on the angle of rotation all over the longitudinal direction of the free magnetic layer, resulting in a significant detection error compared to the case where the longitudinal direction of the free magnetic layer is toward the center of rotation. A GMR element, an MR element, an AMR element, a TMR element, or the like may he applied as the magnetoresistance effect element 31.

The planar shape of the rotor 20 is not limited to the one in the above-described embodiment. The following conditions have only to be met: the sum (L1+L2) of the distances (L1 and L2) between the center of rotation P and the respective two points (Q1 and Q2) where two straight lines' crossing at the center of rotation at the crossing angle $\phi=(\pi/n$; (n) is any integer of at least two) cross the outer periphery of the rotor 20 is constant, and the planar shape of the rotor 20 is symmetric with respect to $Y=\tan(\pi/2n)X$. The planar shape of the rotor 20 meeting these conditions corresponds to the combination of 2n partial ellipses with the center angle ($\pi/n$). One rotation of the rotor 20 provides the detection signal for two periods. It should be noted that in view of the condition that the planar shape of the rotor 20 is symmetric with respect to $Y=\tan(\pi/2n)X$ and the condition that one rotation of the rotor 20 provides the detection signal for (n) periods, a total of (n) types of elliptic ratios are available for 2n partial ellipses ((n) combinations of partial ellipses with the same elliptic ratio). Furthermore, for convenience of description, FIG. 2 shows the case where n=2. However, it should be appreciated that for n≧3, a configuration similar to that shown in FIG. 2 is also applicable.

The present embodiment uses the rotor 20 for which the sum (L1+L2) of the distances (L1 and L2) between the center of rotation P of the rotor 20 and the respective two points (Q1 and Q2) where the two straight lines crossing at the center of rotation P of the rotor 20 at the crossing angle of ($\pi/2$) cross the outer periphery of the rotor 20 is constant and for which the planar shape of the rotor 20 is symmetric with respect to Y=X. Thus, the differential signal is a substantial sine wave signal containing information on the angle of rotation of the rotor 20; the differential signal is obtained by performing differential operation on the detection signals output by the pair of magnetic sensors 30A and 30B (or the pair of magnetic sensors 30C and 30D) arranged close to the outer periphery of the rotor 20 with the difference in angle ($\pi/2$) with respect to the center of rotation P of the rotor 20. Consequently, angle detection can be achieved with a reduced detection error over the entire range of angles (0° to 360°). Furthermore, the rotor 20 need not be attached to the end surface of the rotating shaft 60. This facilitates mounting of the angle detecting apparatus 10.

Now, a method for calculating the planar shape of the rotor 20 will be described with reference to FIGS. 7 and 8.

First, a closed curve of a substantially elliptic shape obtained by combining a half ellipse (f) shown by a solid line and a half ellipse (g) shown by a dashed line in FIG. 7 will be discussed. Intersecting points at which a straight line passing through an origin P crosses the closed curve are defined as R1 and R2. The segment length of a segment PR1 is defined as L3. The segment length of a segment PR2 is defined as L4. Functions for the half ellipses (f) and (g) are defined as shown in the expressions below. Then, for any straight line passing through the origin P, L3+L4 constant.

$$f = x^2 + y^2/a^2 = r^2 \quad (1)$$

$$g(X) = X = 2r \cdot \cos\theta - F(x) \quad (2)$$

$$g(Y) = Y = 2r \cdot \sin\theta - F(y) \quad (3)$$

Figure 9:
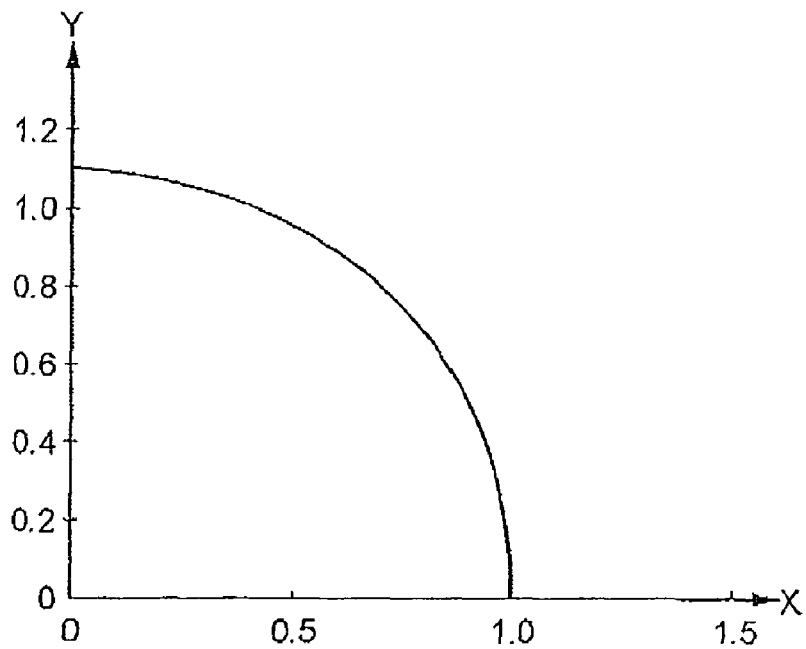
FIG. 9 is a graph of an elliptic function $H(X,Y)$ for $a=0.9$.
Figure 10:
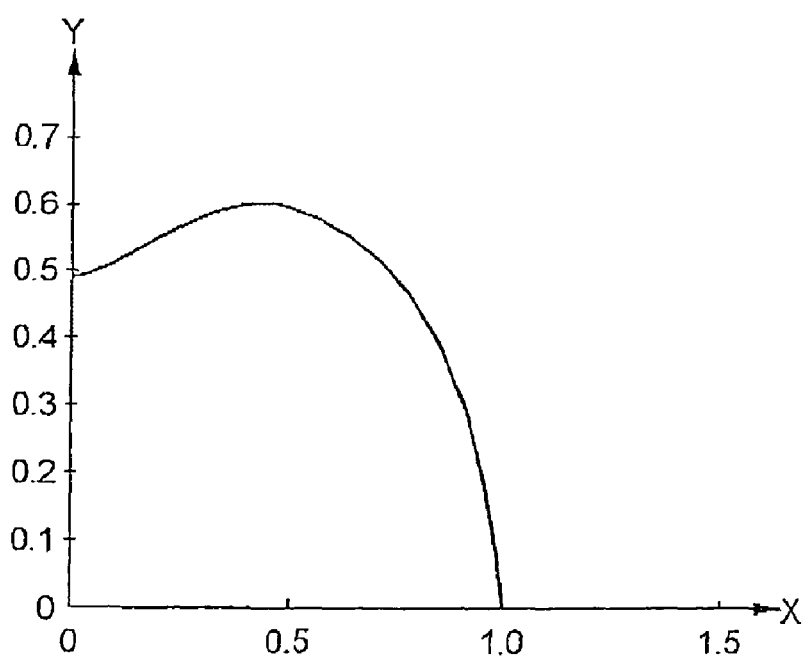
FIG. 10 is a graph of an elliptic function $H(X,Y)$ for $a=1.5$.
Figure 11:
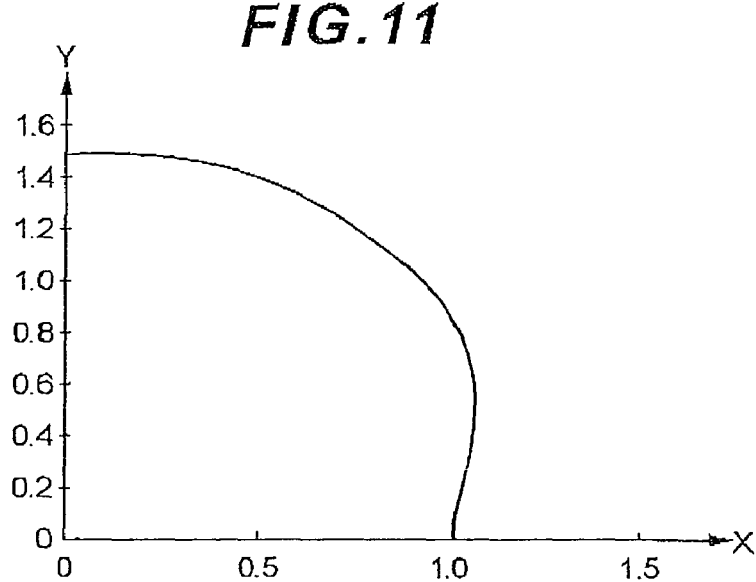
FIG. 11 is a graph of an elliptic function $H(X,Y)$ for $a=a=0.5$.

In the expressions, (a) and (r) are constants (however, 0<a<2: the condition under which the coordinate origin is present in the closed curve surface, a≠1: circles are excluded). Here, when Expressions (2) and (3) are applied to the XY coordinate system, then for a=0.9, the waveform is as shown in FIG. 9 (r=1). However, the waveform varies depending on the value of (a). For example, for a=1.5, the waveform has a trough portion at X=0 as shown in FIG. 10. For a 0.5, X=r when Y>0 as shown in FIG. 11, that is, the waveform has an inflection point where the sign of the curvature changes. Here, in FIGS. 10 and 11, the magnetic field is expected to be disrupted at the trough portion and the inflection point, possibly making the detection output unstable. Thus, the rotor preferably has neither such a trough portion as shown in FIG. 9 nor the inflection point where the sign of the curvature changes. Consequently, the preferable rotor is expressed by a combination of elliptic functions each involving an ellipse ($x^2+y^2/a^2=r$; 0<a<2 (except for a=1)) and containing no trough portion or infection point at which the sign of the curvature changes.

Figure 7:
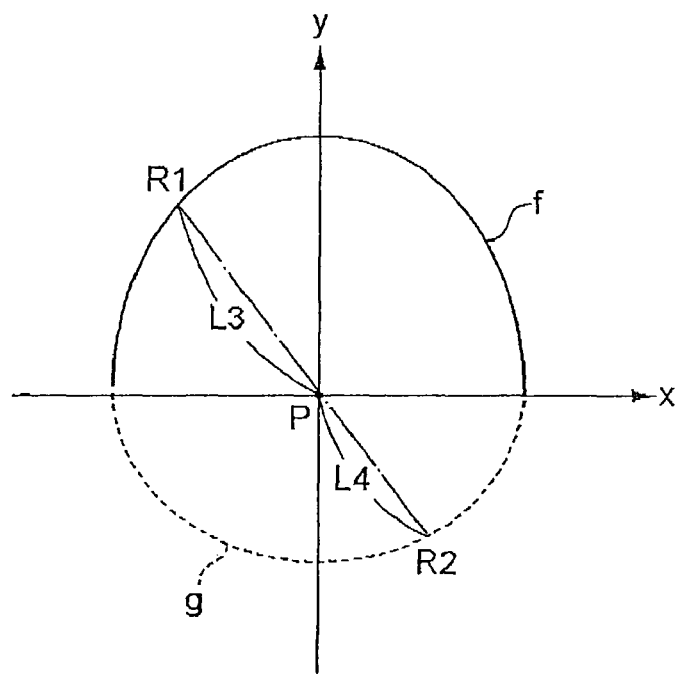
FIG. 7 is a diagram illustrating a method for calculating the planar shape of the rotor.

Here, the present inventors have found that a differential signal with a substantial sine waveform is obtained by processing the planar shape of the rotor 20 so that the planar shape of the rotor 20 matches the substantially elliptic dosed curve shown in FIG. 7, diagonally placing the paired magnetic sensors opposite each other on the straight line passing through the center of rotation P of the rotor 20 and rotating the rotor 20, and performing differential operation on detection signals output by the paired magnetic sensors arranged opposite each other (see Japanese Patent Laid-Open No. 2008-182423). The present inventors also have the following knowledge. With x, y, g(X), and g(Y) in Expressions (1), (2) and (3) expressed as x=r($\theta$)cos $\theta$, y=r($\theta$)sin $\theta$, g(X)=r($\theta$)cos $\theta$, and g(Y)=r($\theta$)sin $\theta$ and with the length of r($\theta$) set to be constant, elliptic functions obtained by converting cos $\theta$ into cos($\theta/2$) and converting sin $\theta$ into sin($\theta/2$) are defined as F and G, respectively. Then, two partial ellipses expressed by the elliptic function F are combined with two partial ellipses expressed by the elliptic function G to obtain a closed curve function defining the planar shape of the rotor 20 (see FIG. 8).

Figure 8:
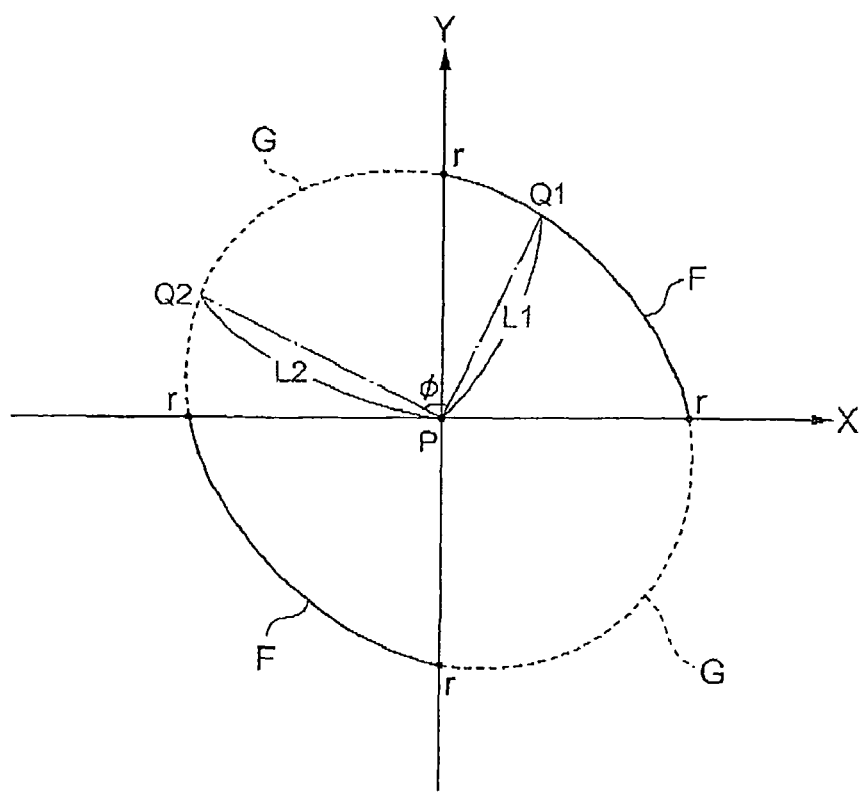
FIG. 8 is a diagram illustrating a method for calculating the planar shape of the rotor.

To obtain a detection signal with a substantial sine wave for two periods when the rotor 20 makes one rotation, it is necessary that L1+L2=2r=constant and $\phi=\pi/2$ in FIG. 8. Thus, the function to be determined crosses a circle with a radius (r) when $\theta=0$, $\pi/2$, $\pi$, and $3\pi/2$. Thus, the function to be determined needs to show symmetry based on $\theta=\pi/4$.

When the elliptic function F is defined as described above, the following expressions hold true.

$$F(X)=X=r(\theta)\cos(\theta/2) \quad (4)$$

$$F(Y)=Y=r(\theta)\sin(\theta/2) \quad (5)$$

When an addition theorem is applied to Expressions (4) and (5), the following expressions hold true.

$$\begin{aligned}F(X) &= X \\ &= r(\theta)\cos(\theta/2) \\ &= r(\theta)\cos(\theta-\theta/2) \\ &= r(\theta)(\cos\theta\cos(\theta/2)+\sin\theta\sin(\theta/2)) \\ &= X\cos\theta + Y\sin\theta\end{aligned} \quad (6)$$

$$\begin{aligned}F(Y) &= Y \\ &= r(\theta)\sin(\theta/2) \\ &= r(\theta)\sin(\theta-\theta/2) \\ &= r(\theta)(\sin\theta\cos(\theta/2)-\cos\theta\sin(\theta/2)) \\ &= X\sin\theta - Y\cos\theta\end{aligned} \quad (7)$$

Here, $\cos\theta=x/r(\theta)$ and $\sin\theta=y/r(\theta)$.

When an addition theorem is applied to Expressions (6) and (7), the following expressions hold true.

$$X=(1/r(\theta))\cdot(x\cdot X+y\cdot Y) \quad (8)$$

$$Y=(1/r(\theta))\cdot(X\cdot y-Y\cdot x) \quad (9)$$

Here, when x and y are expressed using X and Y, the following expressions hold true.

$$x=(X^2-Y^2)\cdot r(\theta)/(X^2+Y^2) \quad (10)$$

$$y=2XY\cdot r(\theta)/(X^2+Y^2) \quad (11)$$

Substituting x and y in Expression (1) with Expressions (10) and (11) allows the elliptic function F to be determined. Similarly, substituting x and y in Expressions (2) and (3) with Expressions (10) and (11) allows the elliptic function G to be determined. Furthermore, $r(\theta)$ is $(X^2+Y^2)^{1/2}$ and can thus be erased. Within the angular range of $0\leq\theta\leq\pi/4$ (the angular range between the X axis and Y=X), the function F to be determined is as follows.

$$(X^2-Y^2)^2+4X^2Y^2/a^2=r^2(X^2+Y^2) \quad (12)$$

The above discussion is also applicable to the case where the following are met: the condition that the sum (L1+L2) of the distances (L1 and L2) between the center of rotation P and the respective two points (Q1 and Q2) where the two straight lines crossing at the center of rotation P at the crossing angle $\phi=(\pi/n)$ cross the outer periphery of the rotor 20 is constant and the condition that the planar shape of the rotor 20 is symmetric with respect to $Y=\tan(\pi/2n)X$.

In general, the following expressions hold true.

$$\cos(\theta/n)=\cos(1-(n-1)/n)\theta \quad (13)$$

$$\sin(\theta/n)=\sin(1-(n-1)/n)\theta \quad (14)$$

Here, the addition theorem is used to expand $((n-1)/n)\theta$ in the triangle function in Expressions (13) and (14) to define X and Y as shown in Expressions (15) and (16). Then, the relations $x=r(\theta)\cos\theta$ and $y=r(\theta)\sin\theta$ and Expressions (4) and (5) can be used to express $\cos(\theta/n)$ and $\sin(\theta/n)$ using X, Y, x, and y.

$$F(X)=X=r(\theta)\cos(\theta/n) \quad (15)$$

$$F(Y)=Y=r(\theta)\sin(\theta/n) \quad (16)$$

Here, $(x^2+y^2)^{1/2}$ or $(X^2+Y^2)^{1/2}$ can be used to erase $r(\theta)$. Thus, x and y can be expressed using only X and Y. The functions F and G can be determined by substituting x and y expressed using X and Y, into Expressions (2) and (3). Then, graphics obtained by folding back the functions F and G with respect to $Y=\tan(\pi/2n)X$ are superimposed on each other so as to alternately and consecutively arrange partial ellipses defined by the functions F and G, all over the periphery of the graphics (at positions where the partial ellipses cross a circle with the radius (r)). Then, a closed curve function defining the planar shape of the rotor 20 is obtained. The present embodiment has been described in conjunction with the elliptic functions. However, of course, the present embodiment is not limited to the ellipses but may be applied to any rotor that allows (n) periods to be implemented. In this case, x and y corresponding to a function for one period is expressed using X and Y, which are coordinates of a function corresponding to (n) periods. Then, by substituting x and y into the function for one period enables the function corresponding to (n) periods to be determined.

Embodiment 2

Figure 12:
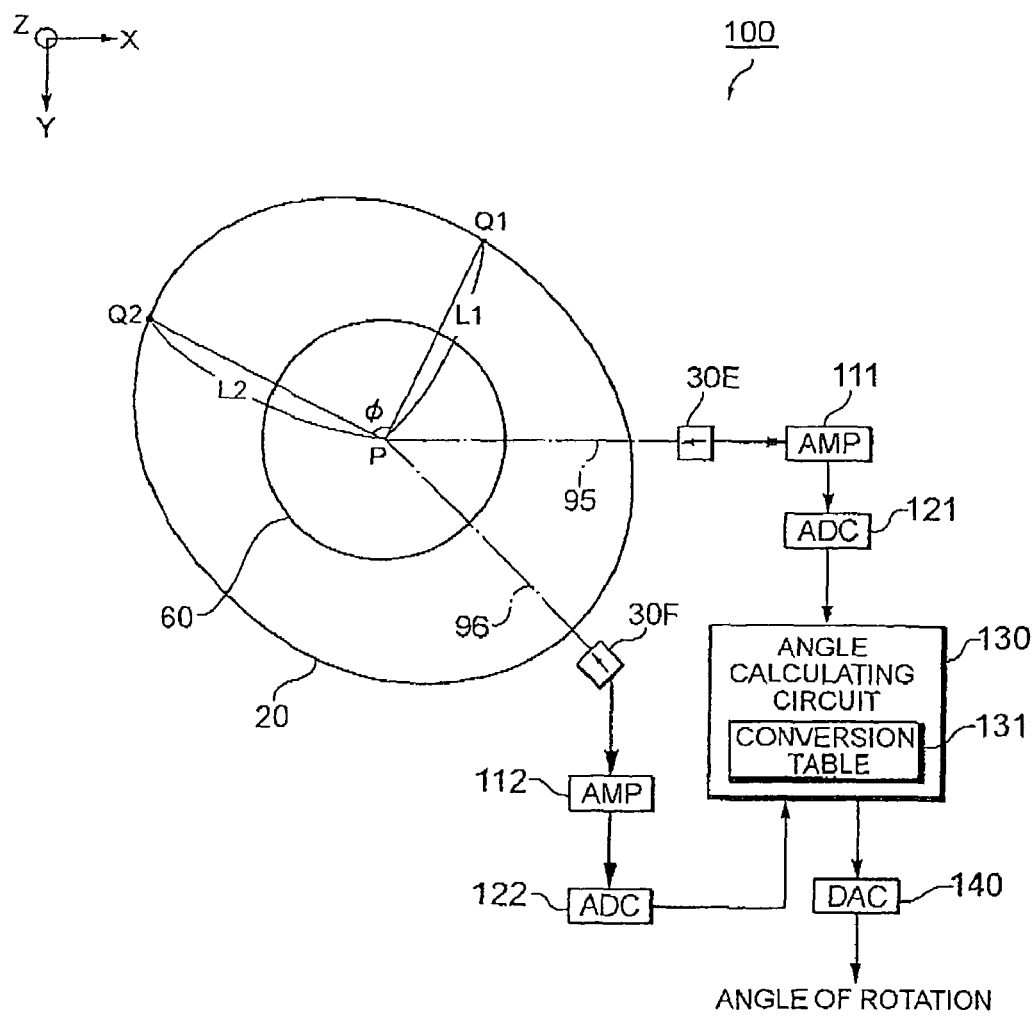
FIG. 12 is a diagram schematically illustrating the configuration of an angle detecting apparatus according to Embodiment 2.

FIG. 12 is a diagram schematically illustrating the configuration of an angle detecting apparatus 100 according to Embodiment 2.

The angle detecting apparatus 100 includes, as main components, a rotor 20 fixed to a rotating shaft 60, two magnetic sensors 30E and 30F arranged close to the outer periphery of the rotor 20, and an angle calculating circuit 130 that outputs the angle of rotation of the rotor 20 based on detection signals output by the two magnetic sensors 30E and 30F. To be distinguished from each other, the magnetic sensors 30E and 30F are denoted by different reference numerals for convenience. However, the magnetic sensors 30E and 30F have substantially the same configuration as that of the magnetic sensor 30 shown in FIG. 1. The magnetic sensor 30E is positioned on an alternate long and short dash line 95 passing through the center of rotation P of the rotor 20. The magnetic sensor 30F is positioned on an alternate long and short dash line 96 passing through the center of rotation P. The two alternate long and short dash lines 95 and 96 cross at 45 degrees. The distance between the center of rotation P and the magnetic sensor 30E is the same as that between the center of rotation P and the magnetic sensor 30F. Thus, the two magnetic sensors 30E and 30F are arranged at the equal distance from the center of rotation P so as to have a difference of 45 degrees in phase (mechanical angle) with respect to the center of rotation P of the rotor 20. The magnetic sensor 30E detects a change in magnetic fields corresponding to a change in the first distance between the outer periphery of the rotor 20 and the magnetic sensor 30E which distance varies periodically in conjunction with rotation of the rotor 20, to output a first, substantial sine wave signal with a waveform similar to a sinusoidal one. The magnetic sensor 30F detects a change in magnetic fields corresponding to a change in the second distance between the outer periphery of the rotor 20 and the magnetic sensor 30F which distance varies periodically in conjunction with rotation of the rotor 20, to output a second, substantial sine wave signal with a waveform similar to a sinusoidal one. The first and second, substantial sine wave signals are detection signals having a difference of 90 degrees in phase (electrical angle) for each half rotation (angle of rotation: 180 degrees)of the rotor 20. For convenience of description, the detection signal output by the magnetic sensor 30E is hereinafter referred to as a cos signal. The detection signal output by the magnetic sensor 30F is hereinafter referred to as a sin signal. The angle calculating circuit 130 holds a conversion table 131. The angle calculating circuit 130 thus reads the angle of rotation of the rotor 20 corresponding to each of the cos and sin signals output by the magnetic sensors 30E and 30F from a conversion table 131, to output the read rotation angle. The conversion table 131 is created by calibration carried out, for example, before shipment or after mounting of the rotating shaft 60.

Figure 13:
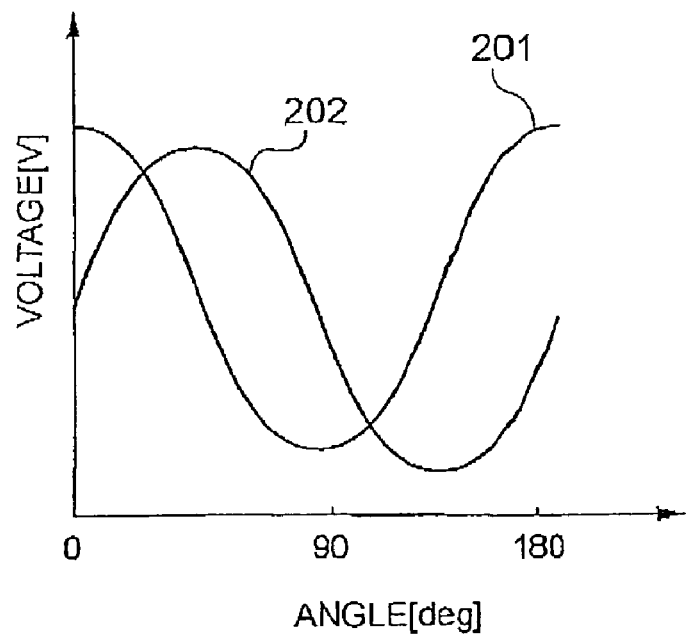
FIG. 13 a graph showing a cos signal and a sin signal before calibration.
Figure 14:
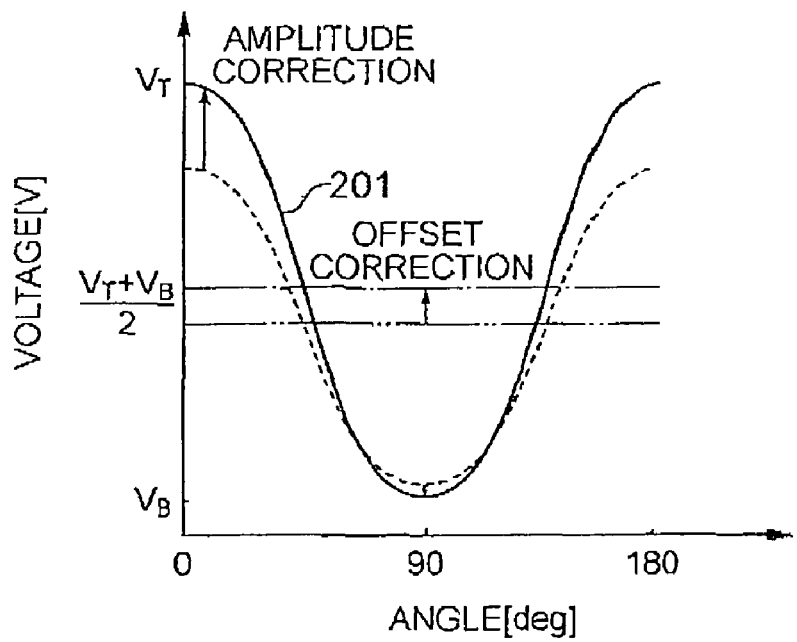
FIG. 14 is a diagram illustrating amplitude correction and offset correction for the cos signal.
Figure 15:
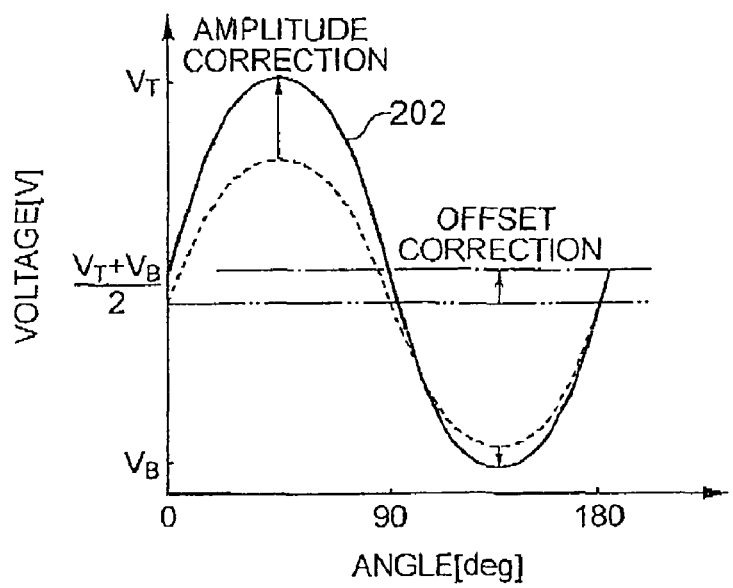
FIG. 15 is a diagram illustrating amplitude correction and offset correction for the sin signal.

Now, a method for creating the conversion table 131 will be described. FIG. 13 shows a cos signal 201 and a sin signal 202 which have not been calibrated. Before calibration, the amplitude and intermediate value of the cos signal 201 normally do not match those of the sin signal 202. Thus, one period of waveforms of the cos signal 201 and the sin signal 202 are retrieved, and the amplitude and intermediate value of each of the cos signal 201 and the sin signal 202 are calculated (it should be noted that half rotation of the rotor 20 allows one period of the cos signal 201 and the sin signal 202 to be output). Then, as shown in FIGS. 14 and 15, so that after calibration, the cos signal 201 and the sin signal 202 have an upper limit value VT, a lower limit value $V_B$, and an intermediate value $(V_T+V_B)/2$, the following are adjusted: the gain and offset value of an amplifier 111 amplifying the cos signal 201 output by the magnetic sensor 30E and the gain and offset value of an amplifier 112 amplifying the sin signal 202 output by the magnetic sensor 30F. Thus, amplitude adjustment and offset correction are carried out on the detection signals. In FIGS. 14 and 15, the dashed line shows a signal waveform before calibration. The solid line shows a signal waveform after calibration. The alternate long and short dash line shows an intermediate value after offset correction. The alternate long and two short dashes line shows an intermediate value before offset correction.

Figure 16:
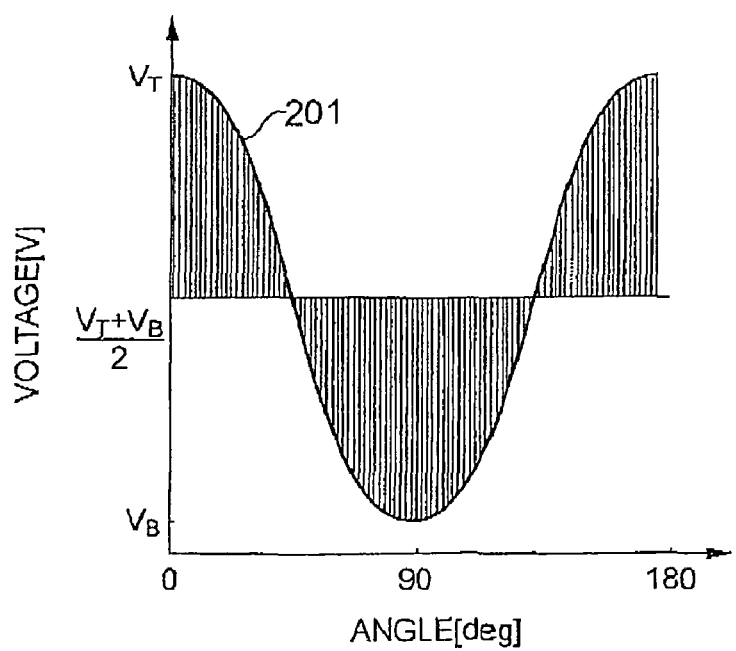
FIG. 16 is a diagram illustrating digital sampling of the cos signal.
Figure 17:
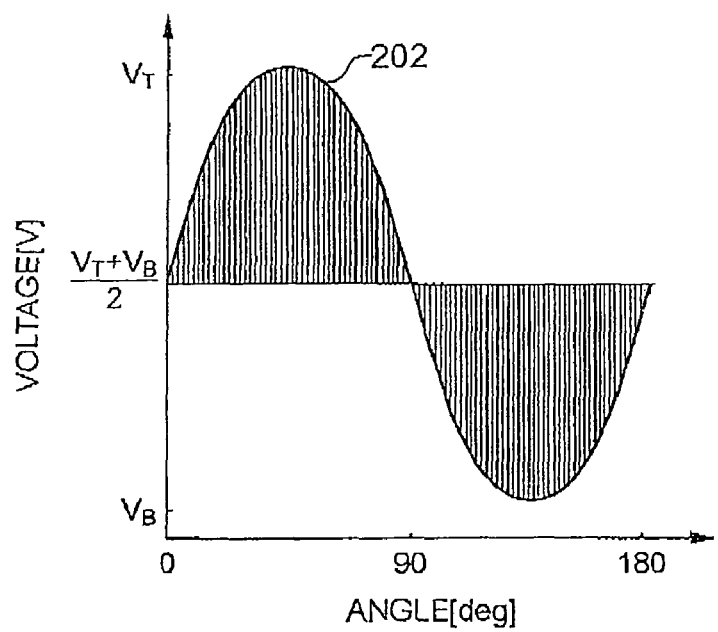
FIG. 17 is a diagram illustrating digital sampling of the sin signal.

The cos signal 201 and sin signal 202 after calibration are converted into digital data by ND converters 121 and 122, respectively. The digital data is then supplied to the angle calculating circuit 130. As shown in FIGS. 16 and 17, the angle calculating circuit 130 samples the digitalized cos signal 201 and sin signal 202 at equal angular intervals for one period. The angle calculating circuit 130 then stores the sampled read data in the conversion table 131 as a cos signal read value 152 and a sin signal read value 153 (see FIG. 18). For example, an angular accuracy of at most 0.1 degree is required to provide a resolution for an angle of rotation of 0.2 degrees. Thus, preferably, the cos signal 201 and the sin signal 202 are sampled at an angular accuracy of at most 0.1 degree so that the sampled read data is stored in the conversion table 131. The time of one period of the digitalized cos signal 201 and sin signal 202 can be calculated to be the interval between the upper limit values (or the interval between the lower limit values). Furthermore, a determination criterion of 0 degrees may be set at the point in time when the cos signal 201 takes the upper limit value or the sin signal 202 takes the intermediate value.

Figure 18:
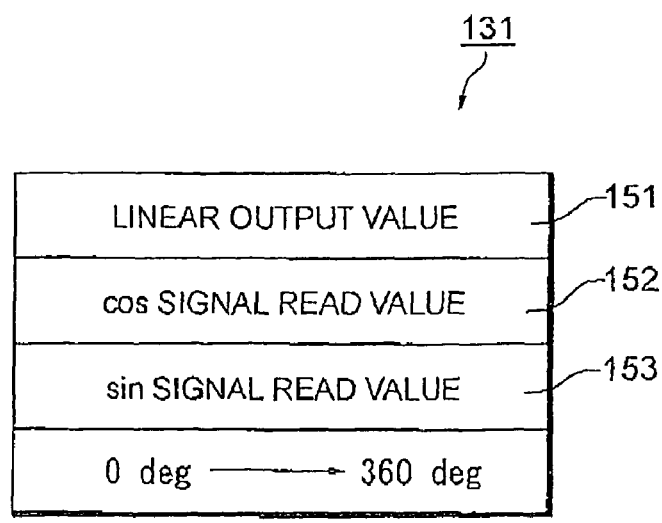
FIG. 18 is a diagram illustrating a conversion table.
Figure 20:
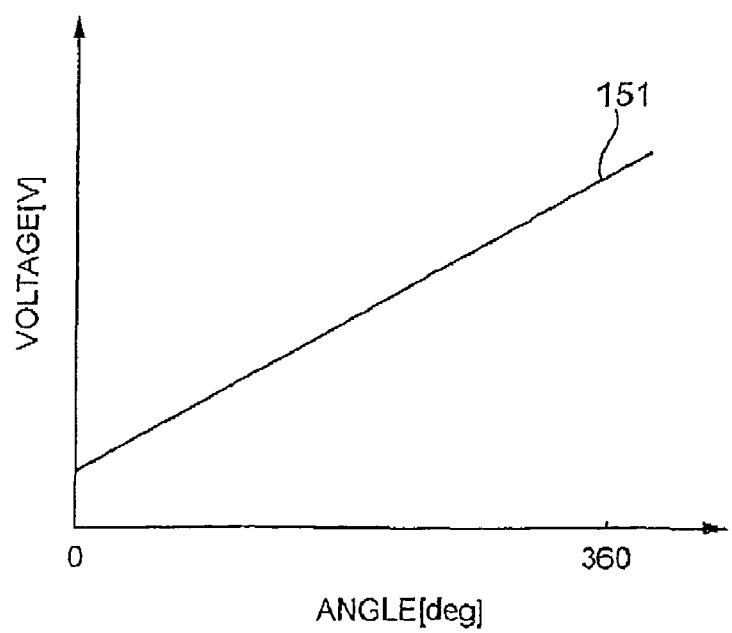
FIG. 20 is a graph of a linear output value.

As shown in FIG. 18, in the conversion table 131, a linear output value 151, a cos signal read value 152, and a sin signal read value 153 are associated with one another over the angular range of 0 degrees to 360 degrees. As shown in FIG. 20, the linear output value 151 is pre-created into map data increasing linearly and monotonously over the angular range of 0 degrees to 360 degrees. For example, so as to be within the range of 1.0 V to 4.0 V, the linear output value 151 may be set to 1.0 V at 0 degrees, to 2.5 V at 180 degrees, and to 4.0 V at 359 degrees so that the angle of rotation of the rotor 20 and the linear output value 151 have a linear relationship. The output range of the linear value 151 can be optionally adjusted and is not limited to the abovedescribed numerical values. Furthermore, the linear output value 151 may be created into map data increasing linearly and monotonously over the angular range of 0 degrees to 360 degrees.

Now, description will be given of a method of determining the angle of rotation of the rotor 20 using the conversion table 131 created through the above-described procedure. The cos signal 201 and sin signal 202 output by the magnetic sensors 30E and 30F are subjected to amplitude adjustment and offset correction by amplifiers 111 and 112. The resulting cos signal 201 and sin signal 202 are sampled at equal angular intervals by A/D converters 121 and 122. The sampled signals are supplied to the angle calculating circuit 130. The angle calculating circuit 130 retrieves the cos signal read value 152 matching the sampling data of the read cos signal 201, from the conversion table 131. The angle calculating circuit 130 then reads the linear output value 151 corresponding to the retrieved cos signal read value 152, from the conversion table 131. The angle calculating circuit 130 further retrieves the sin signal read value 153 matching the sampling data of the read sin signal 202, from the conversion table 131. The angle calculating circuit 130 then reads the linear output value 151 corresponding to the retrieved sin signal read value 153, from the conversion table 131. The thus read linear output value 151 is converted, by a D/A converter 140, into analog data in the form of a signal indicating the angle of rotation of the rotor 20.

Figure 19:
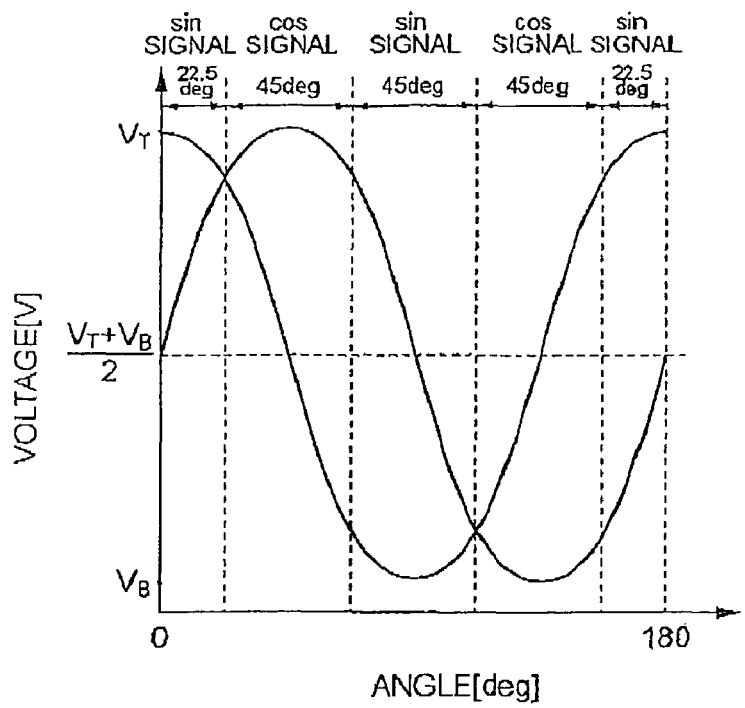
FIG. 19 is a diagram illustrating the read ranges of the cos signal and the sin signal.

At this time, as shown in FIG. 19, the angle calculating circuit 130 preferably reads sampling data failing within the angular range of ±22.5 degrees from the angle at which the signal waveform of each of the cos signal 201 and the sin signal 202 takes the intermediate value. For example, within the angular range of 0 degrees to 22.5 degrees, the sin signal 202 has a larger detection signal amplitude change amount than the cos signal 201 Thus, the sampling data of the sin signal 202 is read. Within the angular range of 22.5 degrees to 67.5 degrees, the cos signal 201 has a larger detection signal amplitude change amount than the sin signal 202. Thus, the sampling data of the cos signal 201 is read. Within the angular range of 67.5 degrees to 112.5 degrees, the sin signal 202 has a larger detection signal amplitude change amount than the cos signal 201. Thus, the sampling data of the sin signal 202 is read. In this manner, sampling data close to the intermediate value, at which the amplitude changes significantly, is read instead of sampling data close to the peak of the signal waveform, at which the amplitude changes insignificantly. This enables a reduction in variation in detection error and also improves resistance to noise.

If the rotor 20 is such that the sum of the distances between the center of rotation P and the respective two points where two straight lines crossing at the center of rotation P at a crossing angle of $(\pi/n)$ cross the outer periphery of the rotor 20 is constant and that the planar shape of the rotor 20 projected on the plane of rotation is symmetric with respect to $Y=\tan(\pi/2n)X$, the magnetic sensors 30E and 30F may be arranged close to the outer periphery of the rotor 20 at an equal distance from the center of rotation P so as to have a difference in angle $(\pi/2n)$ with respect to the center of rotation P ((n) is any integer of at least 2). Furthermore, sampling data is preferably read which falls within the angular range of $-\pi/4n$ from the angle at which the signal waveform of each of the cos signal 201 and the sin signal 202 takes the intermediate value.

Figure 6:
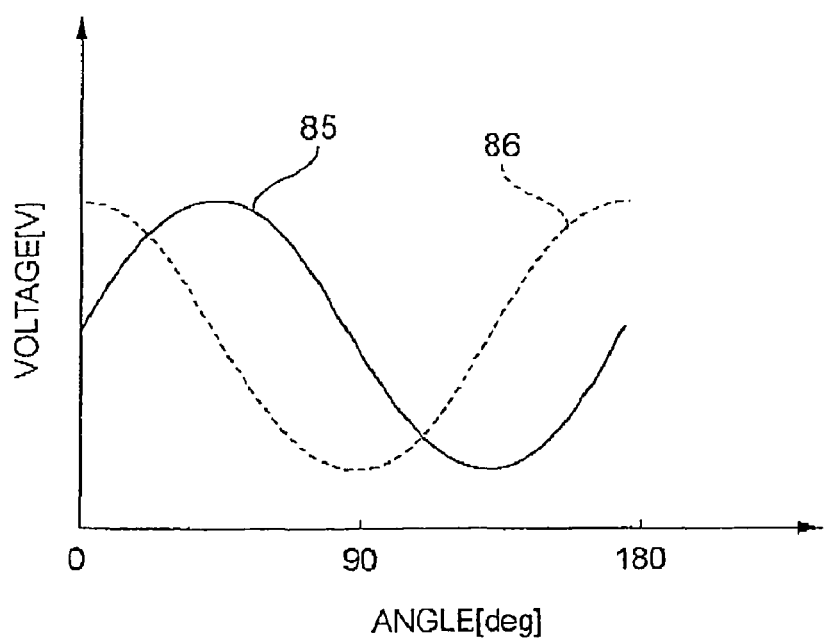
FIG. 6 is a graph showing a differential signal obtained by performing differential operation on the two detection signals output by the respective paired magnetic sensors.

The angle detection method according to Embodiment 2 is applicable to the angle detecting apparatus 10 according to Embodiment 1. The principle of the method will be described in brief. For example, in FIG. 1, the difference in phase (electrical angle) between the sin signal and the cos signal is 90 degrees per rotation of the rotor 20 (this is because half rotation of the rotor 20 sets the difference in phase between the sin signal and the cos signal to 45 degrees as shown in FIG. 6); the sin signal is obtained by performing differential operation on the detection signals from magnetic sensors 30A and 30B with the differential operational circuit 41, and the cos signal is obtained by performing differential operation on the detection signals from magnetic sensors 30C and 30D with the differential operational circuit 42. The angle calculating circuit 50 in which a conversion table similar to the above-described conversion table 131 is pre-mounted can sample and read the sin signal and cos signal output by differential operational circuits 41 and 42, retrieve the angle of rotation of the rotor 20 corresponding to the read sampling data, and output the retrieved angle of rotation. Here, preferably, in the cos signal and sin signal output by the differential operational circuits 41 and 42, sampling data is read which falls within the angular range of ±22.5 degrees from the angle at which the signal waveform of each of the cos signal and the sin signal takes the intermediate value.

The present invention can be utilized for an apparatus and a method for calculating the angle of rotation of a rotating shaft used for a driving mechanism in various technical fields.

What is claimed is:

1. An angle detecting apparatus comprising:
 a rotor fixed to a rotating shaft and for which when an XY orthogonal coordinate system is defined on a plane of rotation for the rotor with a center of rotation of the rotor defined as a coordinate origin, a sum of distances between the center of rotation and respective two points where two straight lines crossing at the center of rotation at a crossing angle of ($\pi/n$; (n) is any integer of at least two) cross an outer periphery of the rotor is constant and for which a planar shape of the rotor projected on the plane of rotation is symmetric with respect to $Y=\tan(\pi/2n)X$; and
 a first magnetic sensor and a second magnetic sensor arranged close to the outer periphery of the rotor so as to have a difference in angle ($\pi/n$) with respect to the center of rotation, the first magnetic sensor detecting a change in magnetic field corresponding to a change in a first distance between the outer periphery of the rotor and the first magnetic sensor which distance varies periodically as the rotor rotates, to output a first detection signal, the second magnetic sensor detecting a change in magnetic field corresponding to a change in a second distance between the outer periphery of the rotor and the second magnetic sensor which distance varies complementarily in conjunction with variation in first distance, to output a second detection signal;
 differential operational means for performing differential operation on the first detection signal and the second detection signal to output a differential signal; and
 angle calculating means for calculating the angle of rotation of the rotating shaft based on the differential signal.

2. The angle detecting apparatus according to claim 1, wherein the rotor projected on the plane of rotation is shaped like a combination of 2n partial ellipses with a center angle ($\pi/n$).

3. The angle detecting apparatus according to claim 1, wherein the shape of the rotor projected on the plane of rotation contains no depressed portion.

4. The angle detecting apparatus according to any one of claim 1, wherein the rotor comprises a ferromagnetic material,
 the first magnetic sensor comprises a first magnet generating a magnetic field between the outer periphery of the rotor and the first magnetic sensor, and a first magnetoresistance effect element outputting the first detection signal in response to the magnetic field varying in response to variation in first distance, and
 the second magnetic sensor comprises a second magnet generating a magnetic field between the outer periphery of the rotor and the second magnetic sensor, and a second magnetoresistance effect element outputting the second detection signal in response to the magnetic field varying in response to variation in second distance.

5. The angle detecting apparatus according to claim 4, wherein the first magnetoresistance effect element comprises a first free magnetic layer for which a longitudinal direction is set to align with a direction of the center of rotation of the rotor, and
 the second magnetoresistance effect comprises a second free magnetic layer for which the longitudinal direction is set to align with the direction of the center of rotation of the rotor.

6. An angle detecting method of detecting an angle of rotation of a rotor fixed to a rotating shaft, using a first magnetic sensor and a second magnetic sensor arranged close to an outer periphery of the rotor so as to have a difference in angle ($\pi/n$; (n) is any integer of at least two) with respect to a center of rotation of the rotor, the method comprising the steps of:
 rotating the rotor for which when an XY orthogonal coordinate system is defined on a plane of rotation for the rotor with the center of rotation defined as a coordinate origin, a sum of distances between the center of rotation and respective two points where two straight lines crossing at the center of rotation at a crossing angle of ($\pi/n$) cross the outer periphery of the rotor is constant and for which a planar shape of the rotor projected on the plane of rotation is symmetric with respect to $Y=\tan(\pi/2n)X$;
 allowing a first detection signal to be output by the first magnetic sensor detecting a change in magnetic field corresponding to a change in a first distance between the outer periphery of the rotor and the first magnetic sensor which distance varies periodically as the rotor rotates;
 allowing a second detection signal to be output by the second magnetic sensor detecting a change in magnetic field corresponding to a change in a second distance between the outer periphery of the rotor and the second magnetic sensor which distance varies complementarily in conjunction with variation in first distance;
 performing differential operation on the first detection signal and the second detection signal to output a differential signal; and
 calculating the angle of rotation of the rotating shaft based on the differential signal.

7. The angle detecting method according to claim 6, wherein the rotor projected on the plane of rotation is shaped like a combination of 2n partial ellipses with a center angle ($\pi/n$).

8. The angle detecting method according to claim 6, wherein the shape of the rotor projected on the plane of rotation contains no depressed portion.

9. The angle detecting method according to any one of claim 6, wherein the rotor comprises a ferromagnetic material, the first magnetic sensor comprises a first magnet generating a magnetic field between the outer periphery of the rotor and the first magnetic sensor, and a first magnetoresistance effect element outputting the first detection signal in response to the magnetic field varying in response to variation in first distance, and the second magnetic sensor comprises a second magnet generating a magnetic field between the outer periphery of the rotor and the second magnetic sensor, and a second magnetoresistance effect element outputting the second detection signal in response to the magnetic field varying in response to variation in second distance.

10. The angle detecting method according to claim 9, wherein the first magnetoresistance effect element comprises a first free magnetic layer for which a longitudinal direction is set to align with a direction of the center of rotation of the rotor, and the second magnetoresistance effect element comprises a second free magnetic layer for which the longitudinal direction is set to align with the direction of the center of rotation of the rotor.

11. An angle detecting apparatus comprising:

a rotor fixed to a rotating shaft and for which when an XY orthogonal coordinate system is defined on a plane of rotation for the rotor with a center of rotation of the rotor defined as a coordinate origin, a sum of distances between the center of rotation and respective two points where two straight lines crossing at the center of rotation at a crossing angle of ($\pi/n$; (n) is any integer of at least two) cross an outer periphery of the rotor is constant and for which a planar shape of the rotor projected on the plane of rotation is symmetric with respect to $Y=\tan(\pi/2n)X$;

a first magnetic sensor and a second magnetic sensor arranged close to the outer periphery of the rotor so as to have a difference in angle ($\pi/2n$) with respect to the center of rotation, the first magnetic sensor detecting a change in magnetic field corresponding to a change in a first distance between the outer periphery of the rotor and the first magnetic sensor which distance varies periodically as the rotor rotates, to output a first detection signal, the second magnetic sensor detecting a change in magnetic field corresponding to a change in a second distance between the outer periphery of the rotor and the second magnetic sensor which distance varies periodically as the rotor rotates, to output a second detection signal;

a conversion table in which the angle of rotation of the rotating shaft corresponding to each of the first and second detection signals is stored, and angle calculating means for comparing the first and second detection signals output by the first and second magnetic sensors with the conversion table to output the angle of rotation of the rotor.

12. The angle detecting apparatus according to claim 11, wherein each of the first and second detection signals is a substantial sine wave signal, and the angle calculating means compares the conversion table with one of the first and second detection signals which falls within an angular range of $\pm\pi/4n$ from an angle at which the detection signal takes an intermediate value, to output the angle of rotation of the rotor.

13. An angle detecting method of detecting an angle of rotation of a rotor fixed to a rotating shaft, using a first magnetic sensor and a second magnetic sensor arranged close to an outer periphery of the rotor so as to have a difference in angle ($\pi/2n$; (n) is any integer of at least two) with respect to a center of rotation of the rotor, the method comprising the steps of:

rotating the rotor for which when an XY orthogonal coordinate system is defined on a plane of rotation for the rotor with the center of rotation defined as a coordinate origin, a sum of distances between the center of rotation and respective two points where two straight lines crossing at the center of rotation at a crossing angle of ($\pi/n$) cross the outer periphery of the rotor is constant and for which a planar shape of the rotor projected on the plane of rotation is symmetric with respect to $Y=\tan(\pi/2n)X$;

allowing a first detection signal to be output by the first magnetic sensor detecting a change in magnetic field corresponding to a change in a first distance between the outer periphery of the rotor and the first magnetic sensor which distance varies periodically as the rotor rotates;

allowing a second detection signal to be output by the second magnetic sensor detecting a change in magnetic field corresponding to a change in a second distance between the outer periphery of the rotor and the second magnetic sensor which distance varies periodically as the rotor rotates; and comparing a conversion table in which the angle of rotation of the rotating shaft corresponding to each of the first and second detection signals is stored, with the first and second detection signals output by the first and second magnetic sensors to output the angle of rotation of the rotor.

14. The angle detecting method according to claim 13, wherein each of the first and second detection signals is a substantial sine wave signal, and outputting the angle of rotation comprises comparing the conversion table with one of the first and second detection signals which falls within an angular range of $\pm\pi/4n$ from an angle at which the detection signal takes an intermediate value, to output the angle of rotation of the rotor.

* * * * *